United States Patent Office 3,432,071
Patented Mar. 11, 1969

3,432,071
DEVICE FOR TRANSPORTING FLUIDS IN PLASTIC CONTAINERS
William C. Burns, Palatine, Ill., and Meye Vlig, Delft, Netherlands, assignors to Shell Oil Company, New York, N.Y., a corporation of Delaware
Filed July 13, 1967, Ser. No. 653,149
U.S. Cl. 220—66                5 Claims
Int. Cl. B65d 7/42

ABSTRACT OF THE DISCLOSURE

Relatively thin walled plastic containers may be used to market liquid commodities without danger of collapsing due to evacuation of the gas space between the surface level of the liquid contents and the container end closure resulting from permeation of the plastic container walls of the gas trapped in said space, which evacuation results from temperature changes, pressure differentials and other factors, by closing the top of said container with a gas impermeable lid having a fluid barrier which divides the gas space into at least two regions. One gas space region, between the fluid barrier and the plastic container wall which is continuous around the periphery of the container, allows only a relatively small volume of the total gas trapped between the lid and the liquid surface level to contact the plastic walls and therefore be subject to permeation and diffusion therethrough.

---

This invention relates generally to end closures for containers used to market liquid commodities such as motor oil or anti-freeze.

More specifically, this invention relates to an end closure for such containers fabricated with thin plastic walls which restricts the total amount of gas trapped between the surface level of the liquid contents of the container and the end closure that is allowed in contact with said plastic walls and therefore subject to loss by permeation and diffusion therethrough.

In the art of packaging liquid commodities for the consumer market in containers or vessels, termed in the art as "cans," it is known that a small gas or air space remains between the underside of the container end and the surface level of the liquid contents. This space is usually the result of filling and closing the container with high speed filling machinery which generates turbulence and other disturbing forces on the liquid within the container such that a volume of the liquid which completely fills the container under quiescent conditions will not be confined within the container walls but a small proportion of that volume will escape over the container sides before the sealing operation can be performed. As a consequence, air and other gasses such as volatiles of the liquid contents fill the residual space within the closed container.

This residual gas space creates cause for concern when the container is fabricated of thin walled plastic. It has been found that such containers, when subjected to temperature changes and pressure differentials, tend to buckle and collapse inwardly along the side walls thereof thereby becoming unsightly in appearance and diminished in stock shelf sales appeal. It is believed that such buckling results from the loss of trapped gases from said gas space by permeation and diffusion through the plastic walls of the container when the temperature of the contents is elevated thereby increasing the gas pressure within. When the contents are subsequently cooled, the gas pressure within the residual space falls below the original level due to the volumetric loss of gas by permeation and diffusion.

With the internal pressure of the container substantially less than the external environmental or atmospheric pressure, a net force is imposed on the container that is greater than the thin plastic side walls are capable of withstanding. Consequently, the internal volume of the container is reduced by collapsing the container side walls until a force equilibrium again is established.

It is therefore an object of this invention to prevent pressure differential buckling of plastic walled containers for liquid commodities by reducing the volume of trapped gases subject to escape through the container side walls.

Another object of this invention is to confine the major portion of trapped gases in a closed, plastic walled, liquid container in a pocket above the liquid surface level formed in the container lid which is fabricated from a gas impermeable material.

A further object of this invention is to provide a plastic walled liquid container having end closure means whereby the vertical stacking of similar containers on the end of a lower container causes a hydrostatic head of pressure within the lower container to place the lower container walls in circumferential tension or hoop stress.

Briefly, the present invention comprises a metallic or some other gas impermeable end closure for a thin walled plastic container having a fluid barrier projecting from the underside of the closure or lid below the surface level of the liquid contents of the container. The fluid barrier has a closed periphery slightly smaller than the interior periphery of the container walls and substantially symmetrical therewith so that a small, closed loop gas space is formed between the fluid barrier and the container wall above the liquid content surface level when the lid is sealed in place. A second gas space is formed above the liquid content surface level within the area enclosed by the inner periphery of the fluid barrier. When the lid is sealed in place on the filled container, the majority of trapped gases is confined between the underside of the lid and the surface level of the liquid contents within the area encompassed by the interior periphery of the fluid barrier. The remainder of the trapped gases is confined within the closed loop space between the fluid barrier outer periphery and the container wall. If permeation and diffusion of the plastic wall of the container occurs, only a portion of the gas trapped within the closed loop space will be lost since said closed loop space is sealed by the liquid contents from the larger, interior space.

The invention will be further described with reference to the drawings wherein.

Figure 1:
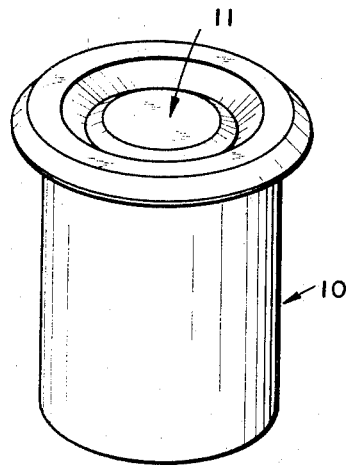
FIGURE 1 is a perspective view of a container of the type described having an end closure according to the present invention.

With reference to FIGURE 1, a container 10 of the type used to distribute such products as motor oil and anti-freeze to the consumer market is shown having an end closure 11, the characteristics of which are described below.

Figure 2:
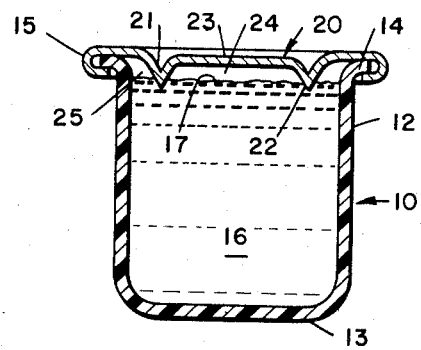
FIGURE 2 is a full cross-sectional view of a container including a closure according to one embodiment of the invention.

Referring to FIGURE 2, the walls 12 of the container 10 may be formed in any convenient shape having a closed, regular periphery such as a cylinder or square sided tube. If desired, the bottom portion or end 13 of the container may be formed as an integral piece of plastic, for example, with the sides 12. Also, if the bottom end 13 is fabricated integrally with the side walls 12 which are relatively thin and structurally weak to radially inwardly directed loads, the bottom end 13 may be of greater thickness than that of the side walls 12. Should the container 10 be stored upside down to render the top closure means of the present invention ineffective, the gas adjacent the thick walled bottom portion 13 will permeate at a much slower rate than if the bottom thickness was the same as the side walls. Otherwise, the bottom end 13 of the container 10 may be closed with a conventional end closure plate secured and sealed to the lower end of the container walls 12.

The upper end of the container walls 12 is provided with a flare or lip 14 around which the outer periphery 15 of the lid 20 is rolled to secure and seal the lid to the container walls.

The plane of the lid 20 is formed with a trough 21 extending symmetrically around the container axis and radially inwardly of the container side wall 12. The purpose of the trough 21 is merely a fabricational expedient to form a fluid barrier 22 on the underside of the lid 20 that projects downwardly below the surface level 17 of the liquid contents 16. An equally effective fluid barrier may also be formed by securing a ring member to the underside of a simple planar lid, said ring member having sufficient axial length to extend below the surface level 17.

In the FIGURE 2 embodiment, the center portion 23 of the lid 20 is planar having a surface generally parallel with the plane of the liquid surface 17. The lid 20 is designed so that when sealed to the container wall flanges 14, a predetermined minimum volume remains between the underside of the center portion 23 and the liquid surface 17 within the area circumscribed by the fluid barrier 22.

Between the container walls 12 and the fluid barrier 22 another gas space 25 is formed above the liquid surface 17. The fluid barrier 22 extends far enough below the surface 17 to maintain a liquid seal between gas spaces 24 and 25 when the container is held upright in a reasonably level position.

In operation, when the container and its contents are subject to repeated temperature changes a certain percentage of the gas trapped in space 25 will permeate the plastic side wall 12 and diffuse into the surrounding atmosphere. However, in view of the fact that the quantity of gas exposed to the container walls is only a small proportion of the total quantity of gas trapped within the container, the fluid barrier 22 maintains an effective separation between the two bodies of gas present in spaces 24 and 25 and, the force effect of such lost gas in the container side walls 12 is held to a minimum within the structural capacity of said side walls. Furthermore, as the pressure within the space 25 is reduced due to lost gas, the surface level 17 will rise under the equalizing pressure influence of the gas in space 24 to further reduce the surface area of the container walls 12 exposed to gas. The consequent diminished surface level of the liquid contents 16 under the center portion of the lid 23 is a factor to be considered in determining how deep the fluid barrier 22 should project below the normal surface level of the liquid contents.

Figure 3:
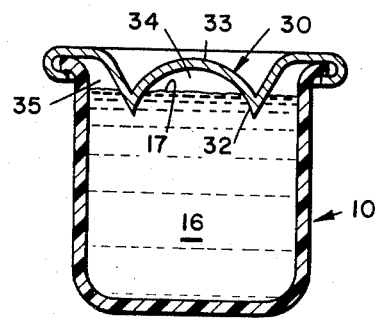
FIGURE 3 is a full cross-sectional view of a container including a closure according to a second embodiment of the invention.

FIGURE 3 is another embodiment of the present invention wherein the center portion 33 of the lid 30 is fabricated in a concave shape with respect to the liquid surface plane 17. By using this shape a greater radial separation may be achieved between the gas spaces 34 and 35. The lens shaped gas chamber 34 centralizes the majority of the gas trapped therein within the center region thereof. The maximum height of the center portion 33 underside above the surface level 17 may be greater than in the case of the planar center portion 24 of FIGURE 2, but the outer periphery of the chamber 34 at the liquid line may be smaller for a given enclosed volume. Hence, a greater deviation of the container from a horizontal position may be tolerated without breaking the liquid seal across the fluid barrier 32 between gas chambers 34 and 35.

Figure 4:
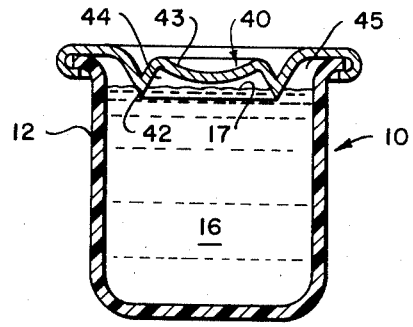
FIGURE 4 is a full cross-sectional view of a container including a closure according to a third embodiment of the invention.
Figure 5:
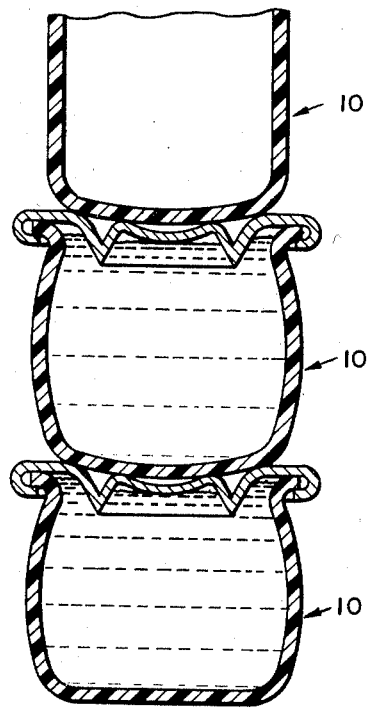
FIGURE 5 is a cross-sectional view of several containers having closures according to the invention that are vertically stacked to show in an exaggerated manner how the closure acts upon the liquid contents to additionally protect the container walls from buckling.

With reference to FIGURE 4 there is shown an embodiment of the present invention wherein the center portion 43 of the lid 40 is convex in shape with respect to the surface level 17 of the liquid contents 16. The advantage of the convex center portion 43 is that by extending the center region of the convexity also below the liquid surface 17 so as to put it in actual contact with the liquid contents 16, the internal hydrostatic head of the container interior may be increased when several containers are stacked vertically in the manner illustrated by FIGURE 5. The minimum gas volume is formed within the closed chamber loop 44 between the fluid barrier 42 and center region of the convex panel 43.

When the center panel 43 of the lid 40 is deflected inwardly by the weight of containers and their contents stacked thereon, the total volume of the container is accordingly reduced. Consequently, the quantity of liquid content 16 displaced by such volumetric reduction is forced up into the gas chambers 44 and 45 to reduce the volume there and resultantly increase the pressure. In addition to diminishing the surface area of the container sides exposed to gas in the outer chamber 45, the increased internal hydrostatic pressure places the side walls 12 of the container 10 in circumferential tension or hoop stress. Such hoop stress counteracts any buckling tendencies of the container wall and collapse due to column loading. Wall failure then becomes a function of the tensile strength of the plastic which is reasonably high for loads which may be expected to be applied in service.

It will be clear that the several embodiments of the invention as described with reference to the drawing are given by way of example only. For example, although the drawings have shown a plastic bottom 13 that is integrally formed with the side walls 12 of the container 10, it will be readily understood by those having skill in the art that the side walls 12 may be formed from continuous tube stock with the bottom end of the resulting side wall cylinder being closed with a lid element such as is described with respect to FIGURES 2, 3 or 4. Furthermore, the top and bottom end closures need not, but may, be identical since one lid embodiment may be used for the top and another embodiment used for the bottom.

We claim as our invention:

1. A device for storing liquid contents comprising:
   a gas permeable plastic wall container structure open at one end and adapted to be filled with liquid contents up to a liquid level in said container;
   a gas impermeable closure means for closing the open end of said container adapted to extend substantially traversely across the open end of said container;
   said closure means including fluid barrier means adapted to project downwardly into said container to a point at least below the liquid level of said container; and
   said fluid barrier means having a closed outer periphery substantially symmetrical with the inner periphery of the open end of said container but of smaller peripheral dimension than the open end of said container whereby a first trapped gas space is formed above the liquid level and between both the open end of said container and the closed outer periphery of the fluid barrier means when said container is filled with liquid contents to its intended liquid level and said closure means is in closing position across the open end of said container.

2. The device of claim 1 wherein said closure means includes an inner periphery for said fluid barrier means, and center panel means at least co-extensive with said inner periphery secured fluid tightly to said fluid barrier means at a point above said liquid level whereby a second trapped gas space is formed within the confines of the fluid barrier means inner periphery between said liquid level and said center panel means.

3. The device of claim 2 wherein the plane of said center panel is substantially parallel with the plane of said liquid level.

4. The device of claim 2 wherein the plane of said center panel is concave with respect to the plane of said liquid level.

5. The device of claim 2 wherein the plane of said center panel is convex with respect to the plane of said liquid level, the interior side of the center region of said panel convexity projecting below said liquid level.

References Cited

UNITED STATES PATENTS

| | | | |
|---|---|---|---|
| 1,963,795 | 6/1934 | Lang | 220—66 |
| 1,987,817 | 1/1935 | Burns | 220—66 |
| 2,027,430 | 1/1936 | Hansen | 220—66 |
| 3,189,072 | 6/1965 | Starr | 150—0.5 |
| 3,341,059 | 9/1967 | Schild et al. | 220—67 |

JOSEPH R. LECLAIR, *Primary Examiner.*

JAMES R. GARRETT, *Assistant Examiner.*